Sept. 26, 1961 G. A. LYON 3,001,494
METHOD OF MAKING WHEEL COVERS
Filed Nov. 5, 1956 5 Sheets-Sheet 1
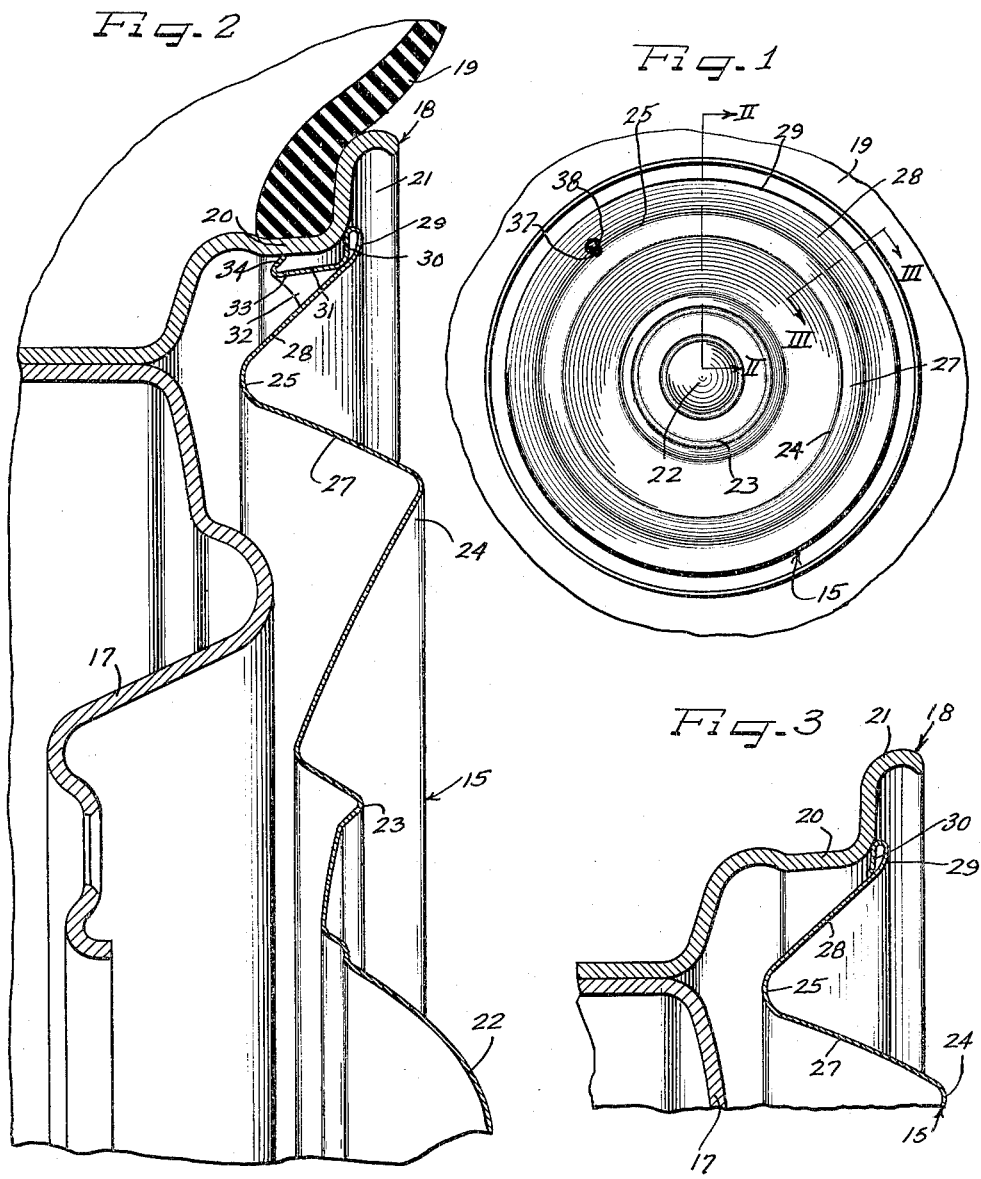
Inventor
GEORGE ALBERT LYON

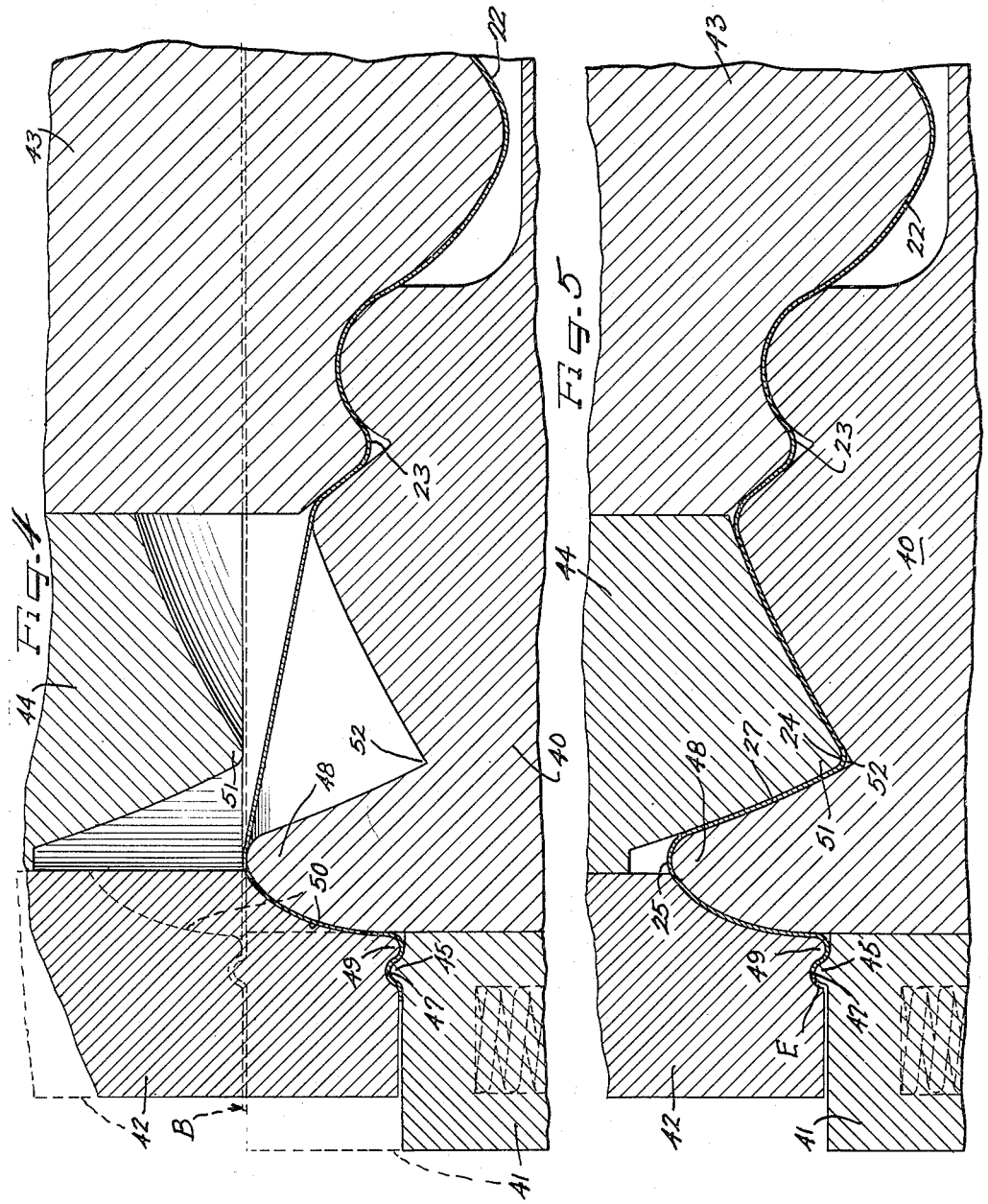

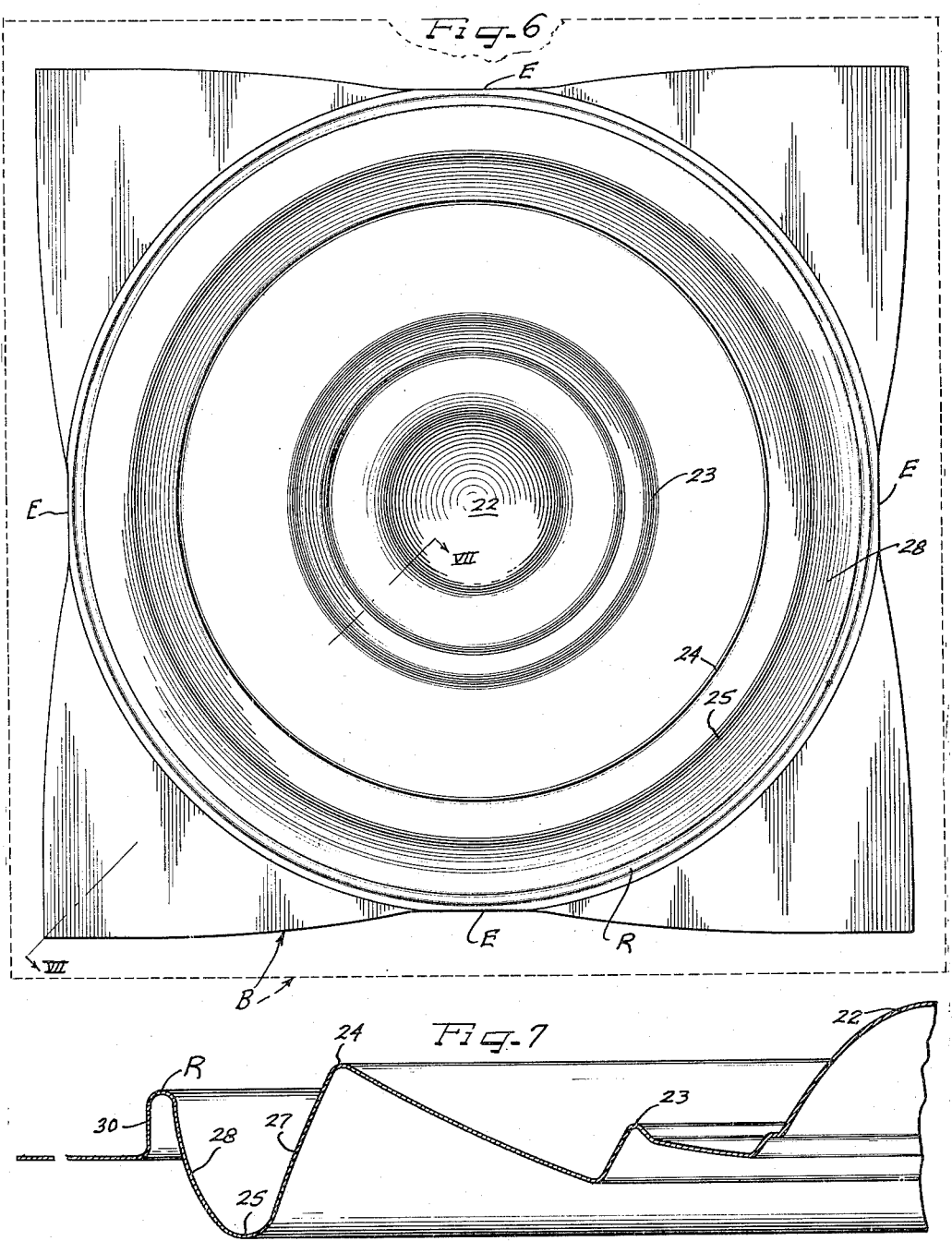

Sept. 26, 1961  G. A. LYON  3,001,494
METHOD OF MAKING WHEEL COVERS
Filed Nov. 5, 1956  5 Sheets-Sheet 4

Inventor
GEORGE ALBERT LYON
by Hill, Sherman, Meroni, Gross & Simpson Attys.

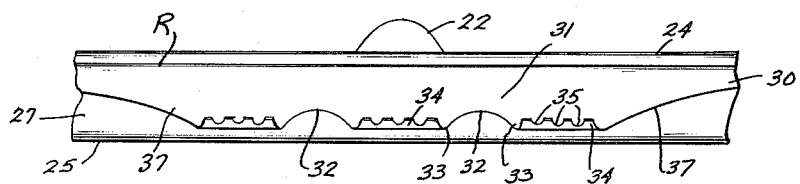
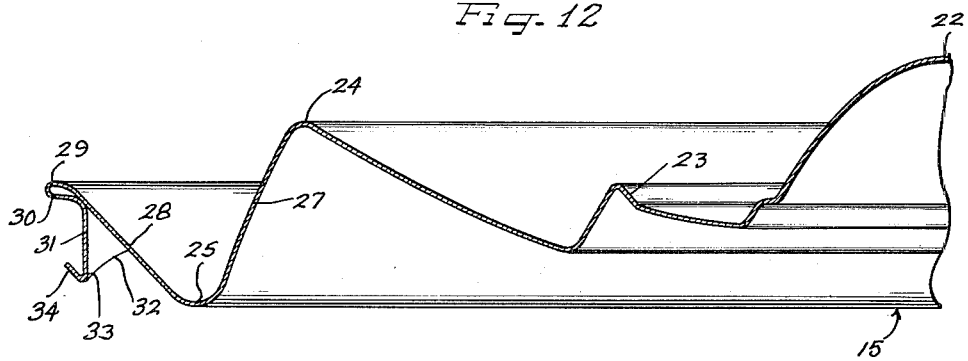
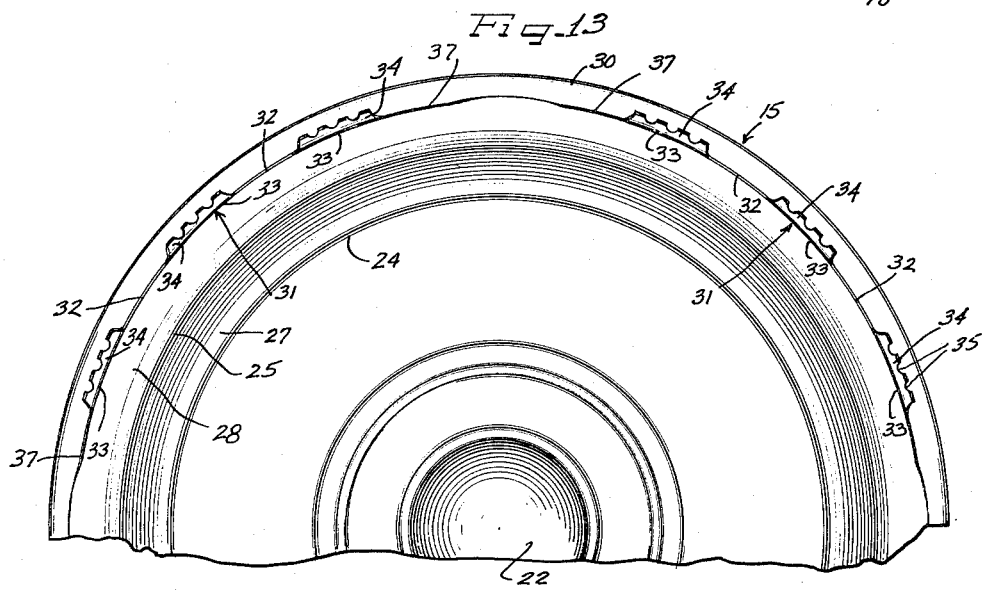

United States Patent Office 3,001,494
Patented Sept. 26, 1961

3,001,494
METHOD OF MAKING WHEEL COVERS
George Albert Lyon, 13881 W. Chicago Blvd.,
Detroit 28, Mich.
Filed Nov. 5, 1956, Ser. No. 620,289
5 Claims. (Cl. 113—116)

The present invention relates to improvements in wheel covers and method of making the same and more particularly concerns wheel covers drawn in thin sheet metal.

As heretofore made, drawn sheet metal covers have involved substantial waste in scrap material. This has of course resulted in a cost factor reflected in the price at which such wheel covers could be supplied to the purchasers.

The problem that has heretofore been deemed to make inevitable substantial scrap loss has been that of uniform drawing in of the material of the polygonal and generally square blank of material in producing the circular drawn contours of the cover profile, some of which and most generally adjacent the outer margin have been fairly deep. It has heretofore been thought necessary to have a substantial flat flange margin about the drawn area of the blank for hold-down purposes in order to avoid uneven drawing in of the blank and thus wrinkling or buckling of the drawn contours adjacent to the drawing area periphery. The hold-down flange has then been trimmed off to the extent necessary to provide the desired marginal flange structure of the completed cover and more particularly the retaining finger structure. In this connection, reference is made to my Patent No. 2,707,449 issued May 3, 1955 in which in the initial phases of the method the use of a blank providing a hold-down flange entirely around the blank and then trimming away of unneeded portions of the flange is alluded to.

I have discovered how to improve the method in my patent referred to by the substantial elimination of trim scrape except for the corner portions of the blank from which the retaining flange or finger structure of the cover is derived.

It is accordingly an important object of the present invention to provide an improved method of drawing sheet metal blanks into wheel covers with greatly minimized scrap losses.

Another object of the invention is to provide an improved method of drawing sheet metal wheel covers from polygonal blanks wherein the corner portions of the blank are utilized for deriving therefrom retaining flange structure and according to which there is minimized tendency of the corner portions of the blank to wrinkle and distort incident to circular drawing of the body portion of the cover.

A further object of the invention is to provide an improved method of drawing circular covers in polygonal sheet metal blanks and wherein substantial portions of the mill cut ends or edges of the blank are retained in the flange structure of the cover margin on which are provided the cover retaining means.

Yet another object of the invention is to provide an improved method of drawing circular sheet metal covers in such closely dimensioned blanks that trimming is eliminated in at least a substantial portion of the periphery of the blank.

A still further object of the invention is to provide an improved drawn sheet metal wheel cover wherein marginal flange structure substantially free from sharp burrs is afforded by the utilization in the cover of the mill cut ends or edges of the blank from which the cover is drawn.

Other objects, features and advantages of the present invention will be readily apparent from the following detailed description of a preferred embodiment thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary radial sectional detail view taken substantially on the line III—III of FIGURE 1;

FIGURE 4 is a more or less schematic, fragmentary sectional detail view taken in a radial plane through a die apparatus for practicing the method of the present invention;

FIGURE 5 is a sectional view similar to FIGURE 4 but showing the die means in the position of the respective elements thereof at the completion of a drawing stroke;

FIGURE 6 is a rear elevation view of a cover blank after having been drawn in the apparatus of FIGURES 4 and 5;

FIGURE 7 is a fragmentary radial sectional view taken substantially on the line VII—VII of FIGURE 6;

FIGURE 11 is a fragmentary side elevational view of the cover when it has reached the stage of formation shown in FIGURE 10;

FIGURE 12 is a fragmentary radial sectional view through the cover after the final forming step in the method; and FIGURE 13 is a fragmentary rear elevational view of the completed cover.

Figure 8:
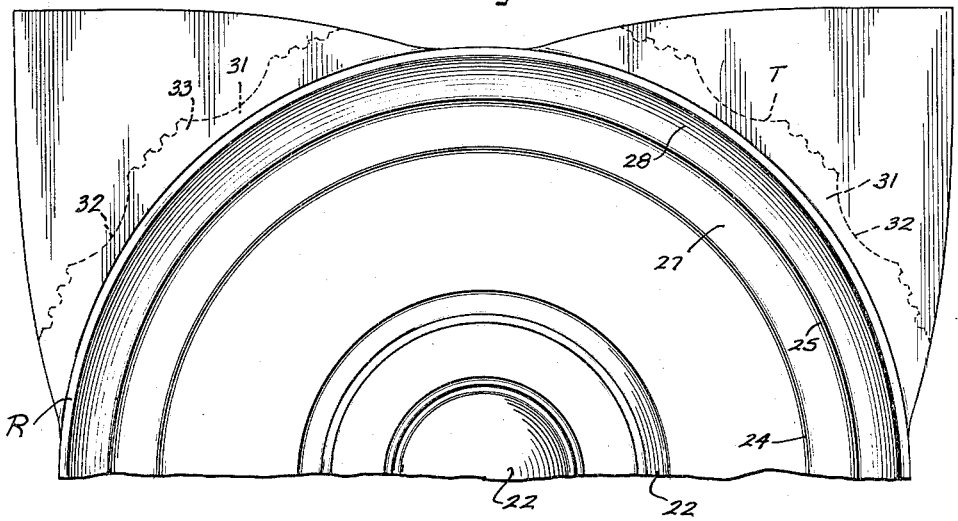
FIGURE 8 is a fragmentary front elevational view of the cover blank of FIGURE 6 after a further drawing and shaping step in the method.

Referring first to FIGURES 1, 2 and 3, a wheel cover 15 embodying features of the invention is constructed and arranged to be applied to the outer side of a vehicle wheel in press-on, pry-off relation, such a wheel comprising a disk spider wheel body 17 supporting a tire rim 18 of the multi-flange, drop center type adapted to support a pneumatic tire 19 which may be of the tubeless type or may be a tire and tube assembly, as preferred. An intermediate generally radially inwardly facing and axially extending annular flange 20 of the tire rim merges with a generally radially outwardly and then axially outwardly turned terminal flange 21, and provides a seat for the tire 19.

The wheel cover 15 comprises preferably a one-piece sheet metal circular drawn member having self-retaining means for engagement with the wheel. To this end, the cover is preferably made from thin, cold work hardenable material such as brass or stainless steel sheet, a suitable material in practice comprising 301 nickel stainless steel which may be of about .018 inch thickness. Such stainless steel has a normal hardness of about 69 to 72 on the Rockwell B scale which, of course, is fairly soft. However, this material is readily cold workable to a hardness that must be measured on the Rockwell C scale, namely, approximately spring steel hardness and resultant resiliency.

Centrally the cover 15 may be variously contoured, being shown herein as provided with a fairly small axially outwardly projecting crown dome 22 having a radially outwardly extending contoured annular portion 23 thereabout leading into a generally axially outwardly projecting annular large rib-like portion 24, all such central portions of the cover overlying the wheel body 17. About the annular rib body portion 24 is a deeply axially inwardly inset or dished intermediate portion 25 of a diameter substantially to overlie the juncture between the tire rim and the wheel body. At its radially inner side the dished portion 25 provides a generally axially outwardly and radially inwardly sloping or oblique annular wall portion 27 while at its radially outer side there is a generally radially and axially outwardly sloping or oblique annular outer marginal cover portion 28 that is dimensioned to overlie the tire rim 18.

On its outer marginal terminus the annular cover marginal portion 28 has a generally radially outwardly turned bead-like finishing and reinforcing formation 29 provided with an underturned generally radially inwardly extending flange 30 from which extends a series of preferably four cover retaining concealed resiliently flexible retaining finger extensions 31. These extensions are actually axially inwardly extending flanges of substantial segmental width and of circumferentially arcuate form disposed on a common circle that is slightly less than the inside diameter of the intermediate flange 20, and of a length such that with the underturned flange 30 bottoming against the shoulder provided at juncture of the terminal flange 21 with the intermediate flange 20, the retaining finger extensions 31 extend to at least midway axially inwardly opposite the intermediate flange.

At their terminal extremities, the retaining finger flanges 31 are subdivided by shallow arcuate cut outs 32 into short individual retaining fingers 33 which are of course connected for mutual resilient coaction in the finger extension flange 31 of which they form a part. Each of the retaining fingers 33 has a turned generally radially and outwardly oblique short and stiff gripping terminal 34 normally extending to a diameter slightly larger than the inside face diameter of the intermediate flange 20 and engageable in resiliently tensioned radially inwardly deflected edgewise generally biting relation against the inside face of the intermediate flange 20. By preference the short stiff terminal flanges 34 are subdivided by shallow notches 35 into a plurality of tips providing substantial numbers of sharp corners that bite into the surface of the intermediate flange and hold the cover against turning.

In applying the cover 15 to the outer side of the wheel, a valve stem 37 is registered with a valve stem aperture 38 in the dished intermediate portion 25 of the cover and the cover then pressed inwardly which causes the stiff retaining finger terminals 34 to cam axially inwardly along the inside face of the intermediate flange 20 and by radially inward compression as the terminal flange is flexed, the individual retaining fingers 33 radially inwardly develop substantial resilient radially outward thrust on the biting tips of the retaining terminals to so grip the intermediate flange as to hold the cover against unintentional axial displacement. Removal of the cover can be effected by applying a pry-off tool behind the underturned flange 30 and applying pry-off force for slidably dislodging the retaining finger terminals 34 from the tire rim.

As the individual retaining fingers 33 are compressed generally radially inwardly and thus placed under resilient tension, due to their short length, as best seen in FIGURES 2, 11 and 12, the retaining finger flange 31 of which they are a part is also placed under resilient tension which is reflected uniformly in the retaining fingers 33 for positive retaining thrust of the retaining terminals 34 against the rim flange. Enhancement of such resilient thrust of the retaining fingers is attained by having the respective opposite sides of the finger extension flange portions 31 provided with widely tapering outer side portions 37 merging with the underturned flange 30 in each instance (FIG. 13). As shown in FIGURE 3, that portion of the flange 30 intermediate adjacent ones of the preferably four retaining finger flange extensions 31 is preferably backed up at its edge against the back of the cover marginal portion 28 and this further enhances the tensioning of the retaining finger extensions, as does also the shouldering of the junctures of the retaining finger extension 31 with the flange portion 30 against the marginal portion 28 as seen in FIGURE 2.

In addition to the improved retaining finger construction, an important feature of the present cover resides in that all of the edges between and including the sides of the finger extension flanges 31 are substantially free from sharp fins or burrs or cutting points so that the present cover is safer to handle than would otherwise be the case. Herein this is attained by having all of such edges comprise mill cut or straight sheared and draw worked rather than die cut. Such mill cut edges are initially substantially smooth and burr free, and the working and stretching of such edges in the course of drawing the cover further aids in smoothing the edges. On the other hand, the edges of the retaining finger terminals 34 are die cut and thus fairly sharp and even possibly containing burrs since these are if anything an asset for wheel flange gripping, biting cover retaining engagement.

According to the present invention, production of the improved cover is effected by drawing the same in blanks of minimal dimensions so that the only trimming necessary is in the formation of the retaining fingers 33. To this end, a flat sheet metal blank B' (FIG. 6) which may be initially of right angular polygonal shape and preferably substantially square, although it may vary a small fraction of an inch through one transverse direction as compared with the transverse direction normal thereto, is initially drawn in drawing die apparatus as shown by way of example in FIGURES 4 and 5. The drawing die apparatus includes a lower or stationary circular die member 40 adapted to be mounted on the anvil of a punch press and having slidably encircling the same a holddown ring die member 41 normally spring urged upwardly to at least the elevation of the upwardmost projecting contour of the stationary or fixedly mounted central circular die structure 40.

Operably coactive with the lower die assembly 40, 41 is an upper reciprocably supported punch die assembly including three relatively and jointly movable portions or sections including a holddown outer ring die portion 42, a central crown shaping punch die portion 43 and an intermediate dishing die ring portion 44.

In following the steps of the method of the instant invention, the closely dimensioned blank B is centered upon the lower die assembly 40, 41, with the margin of the blank lying upon the upraised holddown or marginal clamping die ring member or portion 41 as shown in dash outline in FIGURE 4. Initially, the holddown ring punch die portion or member 42 is driven under pressure thrust clampingly against the blank margin, thereby causing an annular draw ring rib 45 projecting upwardly from the upper clamping surface of the annular ring die member 41 adjacent to but spaced radially outwardly from the inner periphery of such ring die member to work the overlying marginal material of the blank into a complementary annular working groove 47 in the opposing clamping face of the holddown ring member 42. As the punch press pressure continues on the holddown ring die member 42, the marginal portion of the blank is carried below the ridge of an annular upstanding dishing and draw rib 48 on the lower fixed die portion 40. As the marginal portion of the blank is wrapped down about the dishing rib 48, it is drawn inwardly over the draw ring rib 45 and reversely past a rounded contour annular depending draw ring rib 49 on the inner margin of the holddown face of the holddown ring die member 42. Such drawing of the margin of the blank continues uniformly until a clamping surface 50 on the inner periphery of the holddown ring 42 running as a continuation of the inner side of the draw ring rib 49 and complementary to the radially outer side surface of the dishing rib 48 clamps the interposed drawn and shaped portion of the blank against the dishing rib. During this phase of the drawing process, substantial pressure is maintained on the clamped margin sufficient to assure uniform, wrinkle-free work hardening of the blank margin which, however, at the completion of this phase is drawn into its calculated limit, and especially with respect to the narrowest dimensions of the margin with respect to the drawing diameter, that is, at the mid-points of the sides of the polygonal blank, as best seen in full lines in FIGURE 4.

While the marginal drawing and working of the blank is progressing, but preferably close to or at completion of such marginal drawing and working, the central portion of the blank is drawn and worked into the crown formation 22, 23 as shown in FIGURE 4, between the central punch die portion 43 and the central portion of the lower die portion 40, which for this purpose are appropriately circularly contoured as shown, with the lower die portion 40 centrally generally depressed or cavitated for the purpose. This causes the central portion of the blank to be stretched and drawn and generally work hardened. At the conclusion of this central or crown drawing, an annular undrawn portion of the blank is stretched between the crest of the dishing rib 48 and the central portion of the die assembly wherein the crown portion of the blank is now clamped. Such stretched intermediate portion of the blank is under the intermediate punch die portion 44.

As the final step in the initial drawing of the blank, the ring punch member 44 is driven down against the intermediate portion of the blank so that an annular depending drawing nose portion 51 of the ring punch die member draws the intermediate portion of the blank into a complementary groove 52 in the lower stationary die member 40 shaped to provide the drawn annular rib formation 24 of the cover and to shape the annular portion 27 at the radially inner side of the dished portion 25 of the cover. In shaping the divergent wall flange or panel 27 of the cover, the radially outer side of the dishing and drawing rib or nose 51 of the punch die ring coacts with the radially inner side of the annular upstanding drawing rib 48. In doing so, the marginal portion of the blank is drawn inwardly over the radially outer side of the drawing rib 48 and stretched and work hardened, with the extremity of the marginal flange further drawn in until at the original straight sides of the blank the edge is drawn over the radially outer side of the draw ring or rib 45 as best seen in FIGURE 5.

By reason of the large annular area of the blank margin engaged between the opposing radially outer surface of the draw rib 48 and the drawing punch ring surface 50 as well as between the opposing surfaces of the relatively sinuously shaped draw rib 45 and the draw groove 47 as well as the draw rib 49 there is a quite smooth, wrinkle-free, uniformly work hardening drawing in action over the crest of the upstanding draw rib 48 and into the draw groove 52 incident to drawing, punching action of the annular punch ring 44. The resulting shape of the blank B is shown in FIGURE 6 on comparison of the dash outline with the full line showing. Everything inside of the circular drawn perimeter of the cover shape in the blank, inclusive of the intermediate side edges of the blank which run into such perimeter at E are of the utmost smoothness and uniformity, with the corners of the blank margin having the sides thereof curved toward the intermediate edge portions E, and at least those portions of the corners contiguous the drawn perimeter and which during the drawings were gripped between the holddown ring die members 41 and 42 remaining substantially smooth and without distortion or strain ripples. In fact, it has been found that even those portions of the corners that remain outside of the perimeter of the holddown die ring 42 show only quite minor draw strain ripples and actually far less than where the drawing is effected with a wider blank so that there is continuous trim material in the margin outwardly from the drawn circular perimeter. This is apparently due to the substantial freedom of the corner material to draw in and attain the curved-in side shape of the corners as depicted.

Following the initial drawing as described, the drawn blank is subjected to a sizing or restrike die operation wherein the crown contours are completed. At this time, also, a rudimentary marginal rib R of transversely curved form provided in the periphery of the blank by the holddown ring shaping rib 49 and comprising at its radially inner side an extension of the marginal annular section or panel 28, is deepened by wiping down the marginal flange surrounding the rib R to provide the radially outer side of the rib in the form of an axial flange which is actually the subsequently underturned flange 30, as seen in FIGURE 7. At this time, the corner portions of the blank are preferably still maintained flat as shown in FIGURES 8 and 9.

Figure 9:
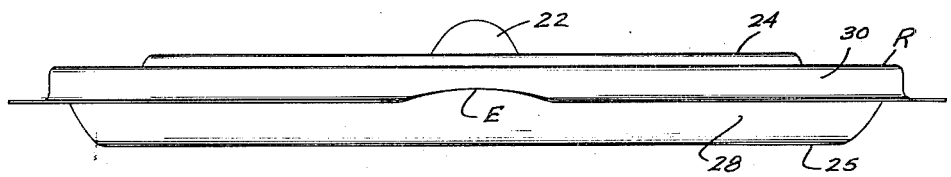
FIGURE 9 is a side elevational view of the cover blank of FIGURE 8.

Then, the flat corner portions of the blank are trimmed away along transverse lines T as shown in FIGURE 8 to outline the respective retaining fingers 31. It will be observed that the sides of the trimmed fingers 31 comprise the original mill edge sides of the blank. This is of substantial advantage since the mill cut edges are substantially smoother and practically free from burrs or sharp cutting points or edges as compared to the die cut edges along the trim line T. On the other hand, a certain amount of roughness or burriness in the tips of the retaining fingers 33 is desirable to enhance the biting, gripping coaction thereof with the tire rim flange to be gripped thereby. The principal burriness of the die trimmed edge will be on the underside of the blank which after the fingers are turned up becomes the corner of the edge that actually enters into biting engagement with the rim flange surface.

Figure 10:
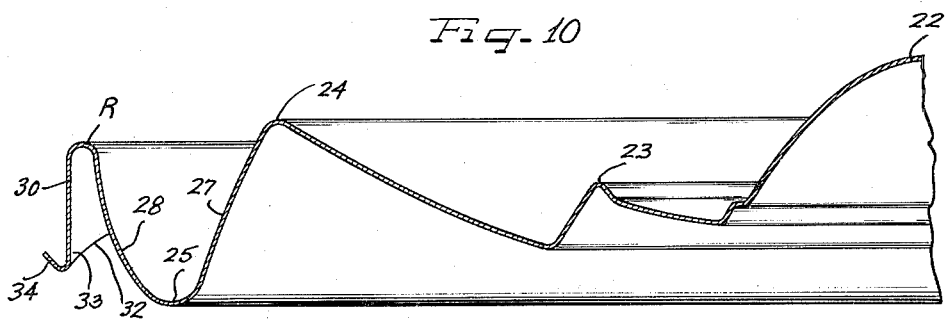
FIGURE 10 is a fragmentary radial sectional view through the cover blank showing the same following a further forming step in the method.

Following trimming out of the fingers 31, the fingers are cold worked and straightened into longitudinally, axially inwardly extending extensions of the side wall 30 of the rib R as best seen in FIGURES 10 and 11. At this same time, the retaining finger terminals 34 are preferably turned up obliquely.

As the final step in shaping of the cover, the rib R is collapsed and turned generally radially outwardly to provide the turned out marginal extremity bead like formation 29 as shown in FIGURES 12 and 13, with the outer side of the rib turned under as the flange 30 and with the finger flange extensions 31 bottoming and backed up at juncture with the flange 30 against the back of the side marginal portion 28 of the cover which during such turn-over of the rib is preferably also substantially straightened as seen on comparison of FIGURE 12 with FIGURE 10. Following such completion of the cover shape, it is ready for polishing and buffing and plating if desired, or any other desired finish.

It will be understood that modifications and variations may be effected without departing from the scope of the novel concepts of the present invention.

I claim as my invention:

1. In a method of making wheel covers from thin sheet metal, centering a blank over a lower drawing die assembly including marginal holddown and shaping portions as well as central and intermediate shaping portions, and then drawing the blank by driving a punch die structure first against the margin of the blank to clamp the same between the holddown and marginal shaping portions of the lower die structure, then subjecting the central portion of the blank to drawing pressure against the central portion of the lower die structure, and finally while maintaining the central and marginal portions of the blank under compression drawing an intermediate portion of the blank into said intermediate shaping portion of the lower die structure and thereby working the marginal material of the blank inwardly past the holddown and marginal shaping portions of the die structure.

2. In a method of drawing a thin sheet metal blank of minimum dimensions into a wheel cover, centering the blank over a lower drawing die assembly, and then subjecting the blank to the following drawing steps in the order named: drawing and contour shaping the marginal portion of the blank between opposite die portions and then maintaining the marginal portion under continuous pressure between said die portions during the succeeding steps, working and shaping a central portion of the blank between additional die portions and then maintaining such central portion under pressure between said additional die portions during the next succeeding step, and finally working and contouring an intermediate portion of the blank and incident thereto further working and drawing in the material of the marginal portion of the blank from said opposing die portions.

3. In a method of drawing a thin sheet metal blank of minimum dimensions into a wheel cover, centering the blank over a lower drawing die assembly, and then subjecting the blank to the following drawing steps in the order named: drawing and contour shaping the marginal portion of the blank between opposing die portions and then maintaining the marginal portion under continuous pressure between said die portions during the succeeding steps, working and shaping a central portion of the blank between additional die portions and then maintaining such central portion under pressure between said additional die portions during the next succeeding step, and finally working and contouring an intermediate portion of the blank and incident thereto further working and drawing in the material of the marginal portion of the blank from between said opposing die portions with edge portions of the blank being thereby drawn into the drawn peripheral extremity of the drawn marginal portion of the cover.

4. In a method of drawing wheel covers in sheet metal blanks of minimum dimension, centering the blanks between drawing die assemblies and therebetween drawing and marginally shaping the blanks between circular holddown ring die members and over a circular drawing rib, while maintaining the marginal portion of the blank under compression between said die members drawing and shaping a circular central portion of the blank between additional die members while an intermediate portion of the blank remains unworked, and, while maintaining the central portion of the blank compressed between said die members and the marginal portion of the blank under pressure between said die members following the shaping thereof, drawing the intermediate portion of the blank into substantial depth contours and further working the marginal portion of the blank over said draw rib by the drawing pressure applied to said intermediate portion.

5. In a method of making wheel covers from thin sheet metal, drawing and working a circular marginal portion of a sheet metal blank between opposing drawing and working surfaces providing a pair of cooperative successively operable closely spaced oppositely directed circular draw ribs and a substantially larger circular draw rib radially inwardly adjacent thereto, thereafter drawing a central portion of the blank while maintaining the marginal portion under compression between said margin drawing ribs, and finally while maintaining the central portion of the blank under compression and the marginal portion under compression, drawing an intermediate portion of the blank and additionally working the marginal portion of the blank inwardly over said ribs.

References Cited in the file of this patent

UNITED STATES PATENTS

| | | |
|---|---|---|
| 1,175,663 | Robinson | Mar. 14, 1916 |
| 1,270,933 | Elsener | July 2, 1918 |
| 1,533,438 | Main | Apr. 14, 1925 |
| 1,642,166 | McCaffrey | Sept. 13, 1927 |
| 1,808,731 | Ireland | June 2, 1931 |
| 1,837,720 | Luce et al. | Dec. 22, 1931 |
| 2,127,598 | Horn et al. | Aug. 23, 1938 |
| 2,163,003 | Lyon | June 20, 1939 |
| 2,163,005 | Lyon | June 20, 1939 |
| 2,282,588 | Lyon | May 12, 1942 |
| 2,689,539 | Lyon | Sept. 21, 1954 |
| 2,747,940 | Tracy | May 29, 1956 |
| 2,763,228 | Lawson | Sept. 18, 1956 |
| 2,807,226 | Lyon | Sept. 24, 1957 |

FOREIGN PATENTS

| | | |
|---|---|---|
| 486,487 | Canada | Sept. 16, 1952 |

OTHER REFERENCES

Jones, F. D. "Die Design and Diemaking Practice," copyright 1941, The Industrial Press, New York, N.Y.